United States Patent
Okamoto et al.

(10) Patent No.: US 10,507,559 B2
(45) Date of Patent: Dec. 17, 2019

(54) MACHINE TOOL AND BRAKE CHECKING METHOD

(71) Applicant: DMG Mori Co., Ltd., Nara (JP)

(72) Inventors: Yoichi Okamoto, Nara (JP); Eiichiro Gomi, Nara (JP)

(73) Assignee: DMG Mori Co. Ltd., Nara (JP)

( * ) Notice: Subject to any disclaimer, the term of this patent is extended or adjusted under 35 U.S.C. 154(b) by 232 days.

(21) Appl. No.: 15/511,304

(22) PCT Filed: Jun. 22, 2015

(86) PCT No.: PCT/JP2015/067859
§ 371 (c)(1),
(2) Date: Mar. 15, 2017

(87) PCT Pub. No.: WO2016/042874
PCT Pub. Date: Mar. 24, 2016

(65) Prior Publication Data
US 2017/0291271 A1    Oct. 12, 2017

(30) Foreign Application Priority Data
Sep. 19, 2014 (JP) .................................. 2014-190856

(51) Int. Cl.
*B23Q 17/00* (2006.01)
*F16H 25/24* (2006.01)
(Continued)

(52) U.S. Cl.
CPC ............. *B23Q 17/007* (2013.01); *B23Q 5/40* (2013.01); *B23Q 5/58* (2013.01); *F16D 66/00* (2013.01);
(Continued)

(58) Field of Classification Search
None
See application file for complete search history.

(56) References Cited

U.S. PATENT DOCUMENTS

| | | | |
|---|---|---|---|
| 3,931,727 | A | 1/1976 | Luenser |
| 2004/0001742 | A1 | 1/2004 | Bornemann |

(Continued)

FOREIGN PATENT DOCUMENTS

| | | | |
|---|---|---|---|
| CN | 101011867 A | 8/2007 | |
| CN | 101830379 A | 9/2010 | |

(Continued)

OTHER PUBLICATIONS

Machine language translation of CN201881190.*
(Continued)

*Primary Examiner* — Mark A Manley
(74) *Attorney, Agent, or Firm* — Fish & Richardson P.C.

(57) ABSTRACT

A machine tool for detecting a brake failure more reliably in a mechanism that stops the rotation of a vertical shaft by at least two brakes includes a ball screw extended in a vertical direction, a driving motor that rotates the ball screw, a movable part that vertically moves along the ball screw in accordance with the rotation of the ball screw driven by the driving motor, at least two brakes that prevent a fall of the movable part while power supply to the driving motor is stopped, a brake controller that releases at least one of the at least two brakes while power supply to the driving motor is stopped, and a detector that detects presence/absence of a fall of the movable part or a fall distance of the movable part resulting from the release of the at least one brake, thereby detecting a trouble of an unreleased one of the at least two brakes.

9 Claims, 13 Drawing Sheets

(51) Int. Cl.
*F16H 25/22* (2006.01)
*B23Q 5/58* (2006.01)
*B23Q 5/40* (2006.01)
*F16D 66/00* (2006.01)
*F16D 121/20* (2012.01)

(52) U.S. Cl.
CPC ..... *F16H 25/2204* (2013.01); *F16H 25/2454* (2013.01); *F16D 2121/20* (2013.01)

(56) References Cited

U.S. PATENT DOCUMENTS

| | | | |
|---|---|---|---|
| 2009/0281702 A1* | 11/2009 | Cahill | F16D 66/025 701/78 |
| 2011/0048863 A1* | 3/2011 | Schroeder-Brumloop | B66B 5/0093 187/359 |
| 2013/0233657 A1* | 9/2013 | Kattainen | H02P 3/04 188/156 |

FOREIGN PATENT DOCUMENTS

| | | |
|---|---|---|
| CN | 101982295 A | 3/2011 |
| CN | 201881190 U | 6/2011 |
| DE | 10 2004 024770 | 12/2004 |
| JP | 53-105776 | 9/1978 |
| JP | 3-5100 | 1/1991 |
| JP | 7-39190 | 2/1995 |
| JP | 10-263973 | 10/1998 |
| JP | 2003-266278 | 9/2003 |
| JP | 3472433 | 9/2003 |
| JP | 2004-009168 | 1/2004 |
| JP | 2007-034653 | 2/2007 |
| JP | 2007-181850 | 7/2007 |
| JP | 2007-203353 | 8/2007 |
| JP | 2010-208778 | 9/2010 |
| JP | 2014-065592 | 4/2014 |
| WO | WO 2012/052600 | 4/2012 |

OTHER PUBLICATIONS

European Patent Office, Extended European Search Report issued in EP Appl. No. 15842214.7 dated May 28, 2018, 7 pages.

SIPO of China, English Translation of First Notification of Office Action issued in CN Appl. No. 201580050291.8 dated Jul. 3, 2018, 16 pages.

* cited by examiner

MACHINE TOOL AND BRAKE CHECKING METHOD

CROSS-REFERENCE TO RELATED APPLICATIONS

This application is the national stage entry of International Patent Application No. PCT/JP2015/067859, filed on Jun. 22, 2015, which claims priority to JP Patent Application No. 2014-190856, filed on Sep. 19, 2014, the entire contents of which are hereby incorporated by reference.

TECHNICAL FIELD

The present invention relates to a machine tool and a brake checking method for the machine tool.

BACKGROUND ART

In the above-mentioned technical field, patent literature 1 discloses a technique which brakes a ball screw and sets 0 as a speed command to a servo motor at the same time when power supply is stopped.

On the other hand, patent literature 2 discloses a mechanism which prevents a free fall by an electromagnetic brake when the power supply is turned off.

In addition, patent literature 3 has disclosed a brake motor which stops the rotation of the motor shaft when no electric current is supplied.

Furthermore, patent literature 4 discloses a technique which controls a brake apparatus first by delaying a power shutoff command, thereby braking a gravity axis.

CITATION LIST

Patent Literature

Patent literature 1: Japanese Patent No. 3472433
Patent literature 2: Japanese Patent Laid-Open No. 2007-034653
Patent literature 3: Japanese Patent Laid-Open No. 2007-181850
Patent literature 4: Japanese Patent Laid-Open No. 2004-009168

SUMMARY OF THE INVENTION

Technical Problem

In the techniques described in the above literatures, however, only one brake is provided for one ball screw, so an accident may occur if the brake fails.

To prevent this, it is possible to propose a mechanism which reliably stops the rotation of one vertical shaft (ball screw) by using at least two brakes. In this case, however, a user may keep using the mechanism without noticing a failure of one brake.

The present invention enables to provide a technique of solving the above-described problem.

Solution to Problem

One aspect of the present invention provides a machine tool comprising
a ball screw extended in a vertical direction,
a driving motor that rotates the ball screw,
a movable part that vertically moves along the ball screw in accordance with the rotation of the ball screw driven by the driving motor,
at least two brakes that prevent a fall of the movable part while power supply to the driving motor is stopped,
a brake controller that releases at least one of the at least two brakes while power supply to the driving motor is stopped, and
a detector that detects presence/absence of a fall of the movable part or a fall distance of the movable part resulting from the release of the at least one brake, thereby detecting a trouble of an unreleased one of the at least two brakes.

Another aspect of the present invention provides a brake checking method for a machine tool including
a ball screw extended in a vertical direction,
a driving motor that rotates the ball screw,
a movable part that vertically moves along the ball screw in accordance with the rotation of the ball screw driven by the driving motor, and
at least two brakes that prevent a fall of the movable part while power supply to the driving motor is stopped,
the method comprising
releasing at least one of the at least two brakes while power supply to the driving motor is stopped, and
detecting a fall distance of the movable part resulting from the release of the at least one brake, thereby detecting a trouble of an unreleased one of the at least two brakes.

Advantageous Effects of Invention

According to the present invention, it is possible to more reliably detect a brake failure in a mechanism which stops the rotation of a vertical shaft by at least two brakes.

DESCRIPTION OF THE EMBODIMENTS

Embodiments of the present invention will exemplarily be explained in detail below with reference to the drawings. However, constituent elements described in the following embodiments are merely examples, and are not intended to limit the technical scope of the present invention.

First Embodiment

Figure 1A:
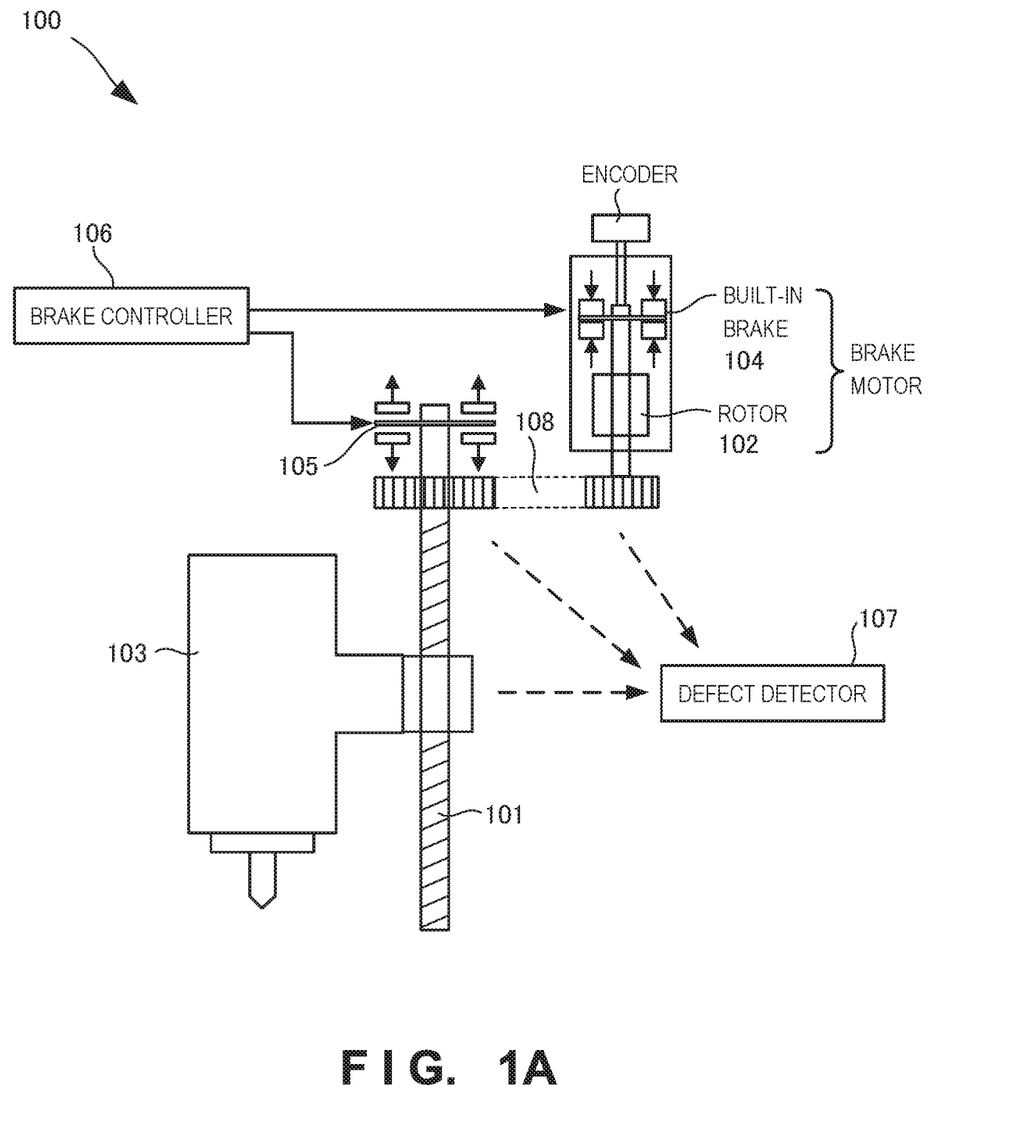
FIG. 1A is a view showing the arrangement of a machine tool according to the first embodiment of the present invention.
Figure 1B:
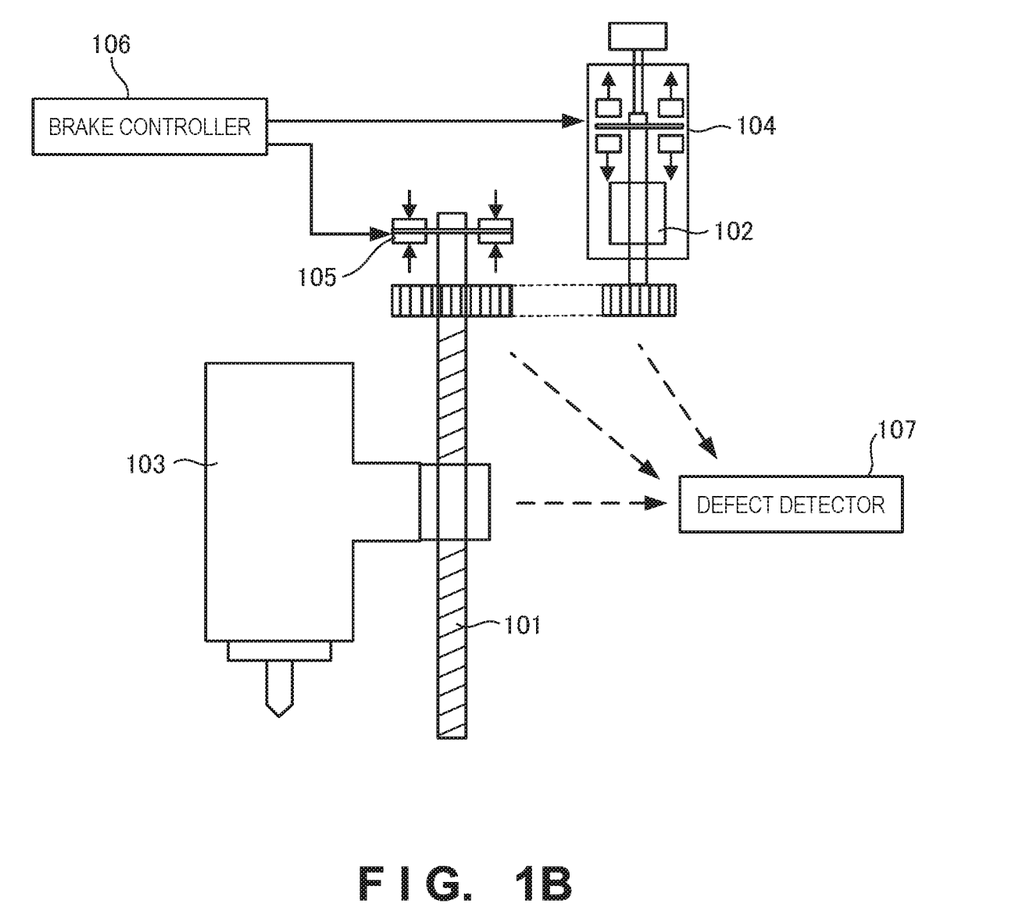
FIG. 1B is a view showing the arrangement of the machine tool according to the first embodiment of the present invention.

A driving mechanism unit 100 of a machine tool as the first embodiment of the present invention will be explained with reference to FIGS. 1A and 1B. As shown in FIGS. 1A and 1B, the driving mechanism unit 100 of the machine tool includes a ball screw 101, a rotor 102, a movable part 103, at least two brakes 104 and 105, a brake controller 106, and a trouble detector 107. As an example, FIGS. 1A and 1B show a brake motor incorporating the rotor 102 and brake 104.

The ball screw 101 is vertically extended. When the rotor 102 rotates the ball screw 101, the movable part 103 vertically moves along the ball screw 101 in accordance with the rotation of the ball screw 101. FIGS. 1A and 1B show an arrangement in which the rotor 102 is coupled with the ball screw 101 via a toothed belt 108 as an example, but the present invention is not limited to this. For example, the driving motor may also be coupled with the ball screw via a joint.

The at least two brakes 104 and 105 form a mechanism of preventing a fall of the movable part 103 when power supply to the driving motor is stopped. A plurality of brakes are attached to one shaft in order to give redundancy to a safety function, i.e., fall prevention.

When power supply to the driving motor is stopped, the brake controller 106 causes the at least two brakes 104 and 105 to function one by one. In a normal operation, "all" of the plurality of brakes are "simultaneously" operated. The purpose of releasing at least one brake is to check the brake function.

The brake controller 106 releases all of the at least two brakes except one brake. For example, the brake controller 106 releases two brakes when there are three brakes, and releases three brakes when there are four brakes.

Also, when powering off the driving mechanism unit 100 of the machine tool, the brake controller 106 stops power supply to the rotor 102, and then releases at least one of the at least two brakes. That is, when powering off the driving mechanism unit 100 of the machining tool, the brake 104 or 105 is inspected.

For example, FIG. 1A shows a state in which the brake 105 is released while preventing the rotation of the shaft of the rotor 102 by operating the brake 104. If the movable part 103 falls in this state, the trouble detector 107 can determine that the brake 104 has a trouble. On the other hand, FIG. 1B shows a state in which the brake 104 is released while preventing the rotation of the ball screw 101 by operating the brake 105. If the movable part 103 falls in this state, the trouble detector 107 can determine that the brake 105 has a trouble.

As described above, the trouble detector 107 causes the at least two brakes 104 to 105 to function one by one, thereby detecting the presence/absence of a fall of the movable part 103 or the fall distance of the movable part 103, and detecting troubles of the at least two brakes 104 and 105. That is, if the movable part 103 falls or the fall distance is equal to or larger than a predetermined value, the trouble detector 107 detects that the brake 104 or 105 has a trouble, and notifies the user of the trouble.

Accordingly, even when one of the two brakes fails, this brake failure can be detected before the other brake fails, so a fall can be prevented.

Second Embodiment

Figure 2A:
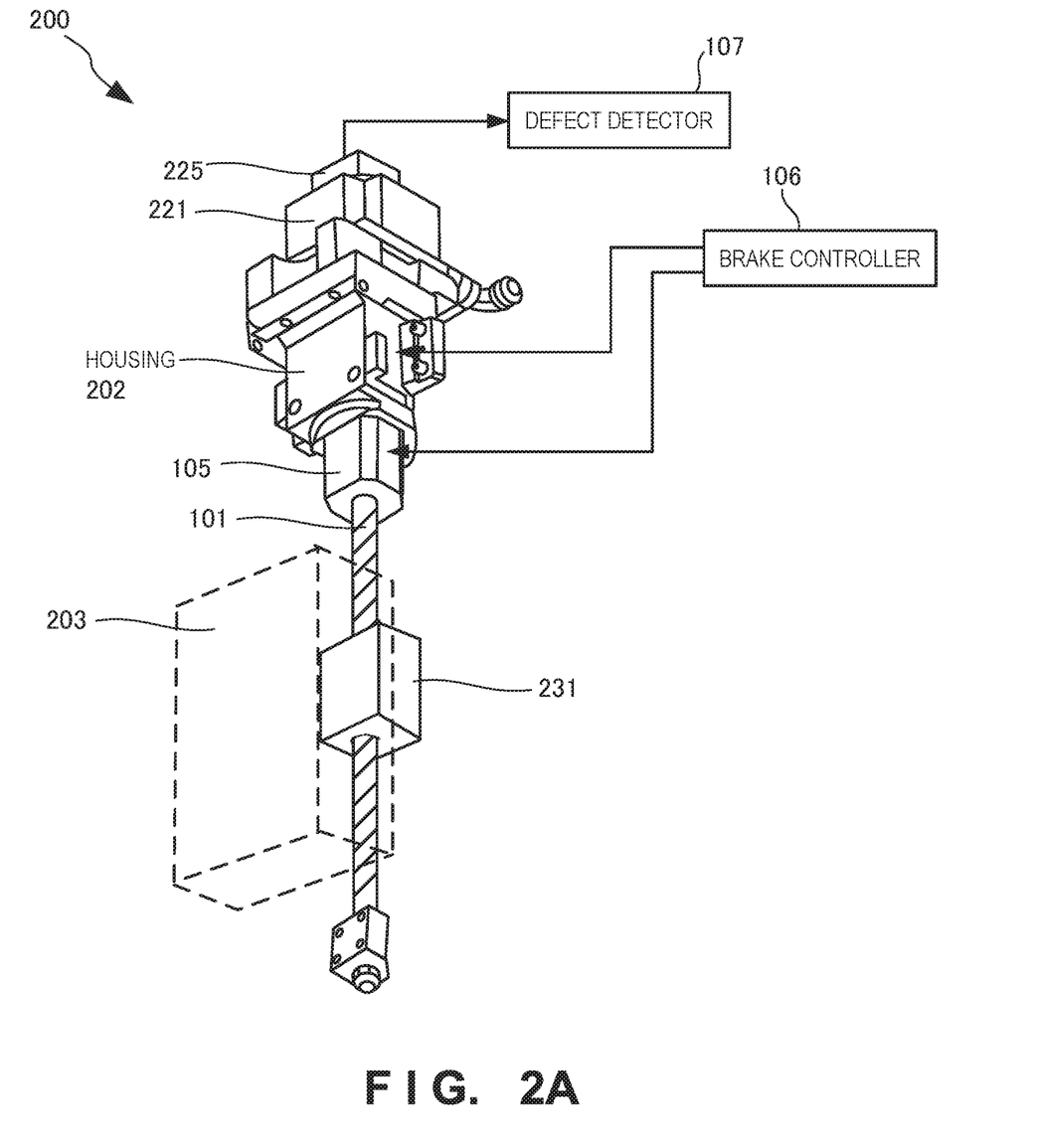
FIG. 2A is a perspective view showing the outer appearance of the arrangement of a machine tool according to the second embodiment of the present invention.
Figure 2B:
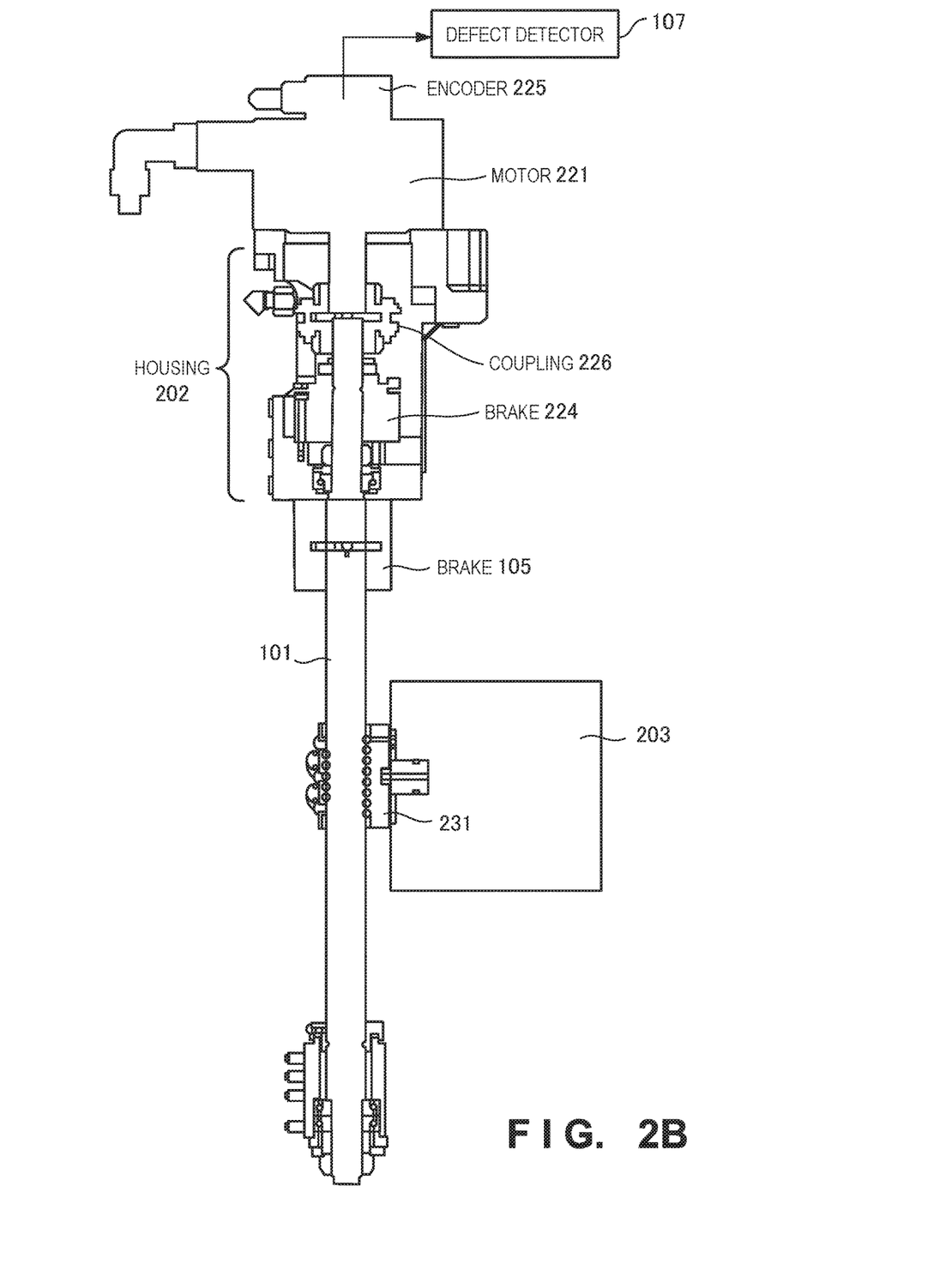
FIG. 2B is a sectional view showing the arrangement of the machine tool according to the second embodiment of the present invention.
Figure 2C:
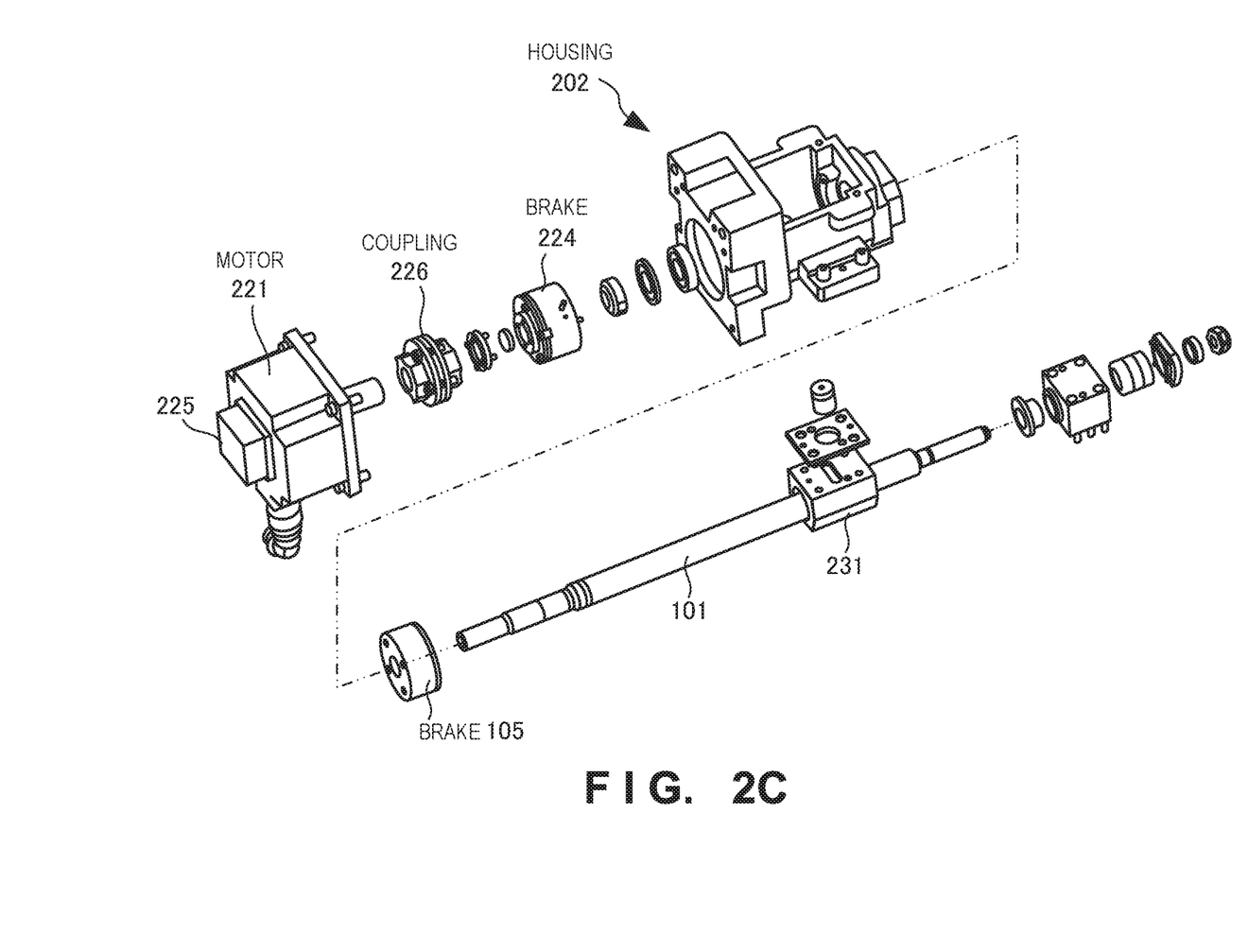
FIG. 2C is an exploded view showing the arrangement of the machine tool according to the second embodiment of the present invention.

Next, a driving mechanism unit 200 of a machine tool according to the second embodiment of the present invention will be explained with reference to FIGS. 2A to 5. FIG. 2A is a view for explaining the outer appearance of the driving mechanism unit 200 of the machine tool according to this embodiment, FIG. 2B is a sectional view showing the internal arrangement of the driving mechanism unit 200 of the machine tool, and FIG. 2C is an exploded view of the driving mechanism unit 200. The driving mechanism unit 200 of the machine tool according to this embodiment differs from the above-mentioned first embodiment in that a ball screw, electromagnetic brake, and driving motor are arranged on the same axis. The rest of the arrangement and the operations are the same as those of the first embodiment, so the same reference numerals denote the same components and operations, and a detailed explanation thereof will be omitted. In this embodiment, a driving motor 221 does not incorporate any electromagnetic brake, and both of two electromagnetic brakes 105 and 224 are installed outside the driving motor 221.

Referring to FIGS. 2A and 2B, a housing 202 is formed on the same axis as that of a ball screw 101, and the electromagnetic brake 105 is formed between the housing 202 and the ball screw 101. A movable part 203 is coupled with a ball nut 231, and vertically moves along the ball screw 101. A brake controller 106 controls power supply to the two electromagnetic brakes 105 and 224 inside and outside the housing 202, thereby causing the electromagnetic brakes 105 and 224 to function one by one. A coupling 226 couples the ball screw 101 and the driving motor shaft. The electromagnetic brake 224 is formed below the coupling 226. As shown in FIG. 2C, the housing 202 is a box for attaching the driving motor 221, and the electromagnetic brake 224 and coupling 226 are accommodated in this box. An encoder 225 is attached to (incorporated into) the driving motor 221, and functions as a rotation amount detector for detecting a rotation amount. The movable part 203 is coupled with the ball nut 231. In addition, a trouble detector 107 determines the presence/absence of a trouble based on the rotational speed detected by the encoder 225. That is, a state in which only the electromagnetic brake 105 is operated or a state in which only the electromagnetic brake 224 is operated is intentionally generated, and whether the ball screw 101 rotates when the electromagnetic brakes 105 and 224 are caused to function one by one is detected. If the ball screw 101 rotates, it is determined that the electromagnetic brake 105 or 224 has a trouble, and a special operator performs maintenance.

Figure 3:
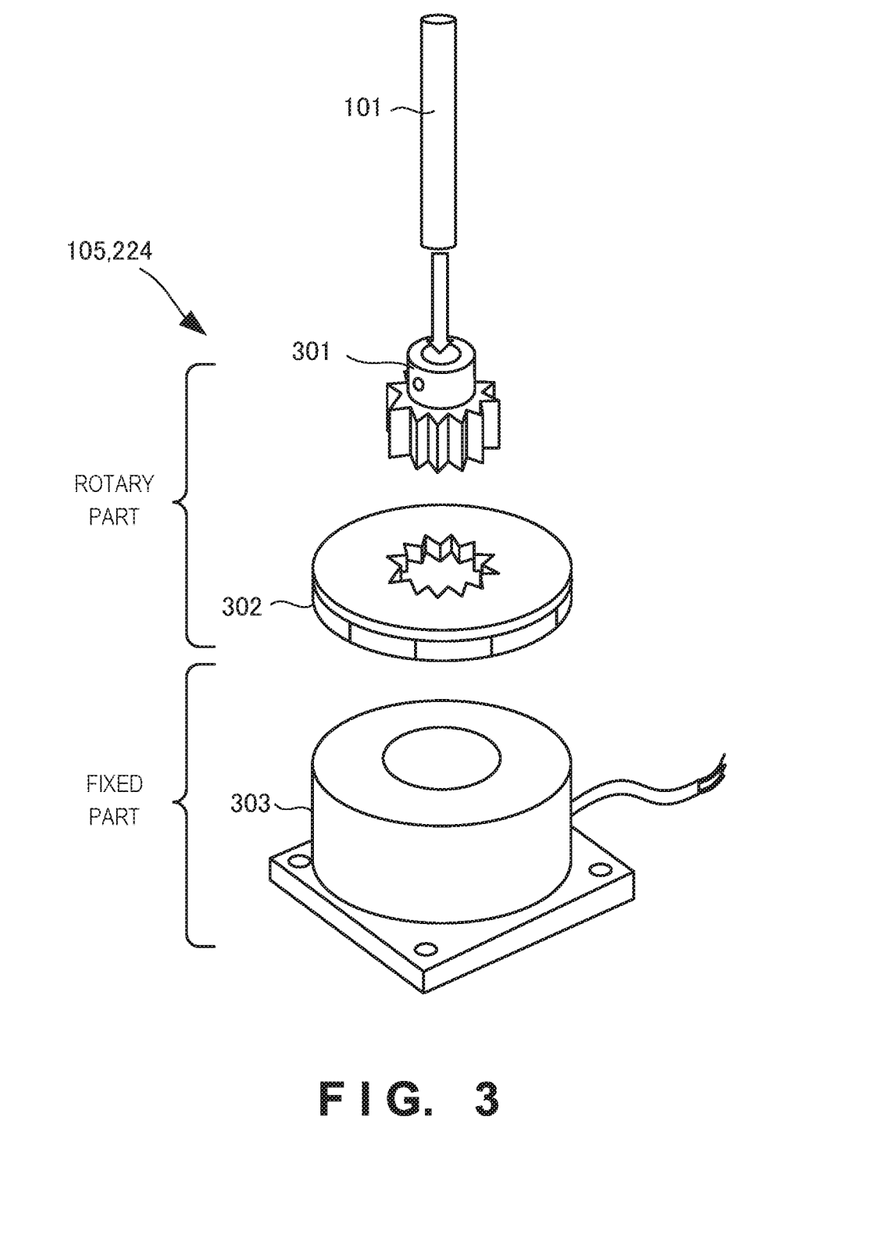
FIG. 3 is an exploded view showing the arrangement of an electromagnetic brake according to the second embodiment of the present invention.
Figure 4:
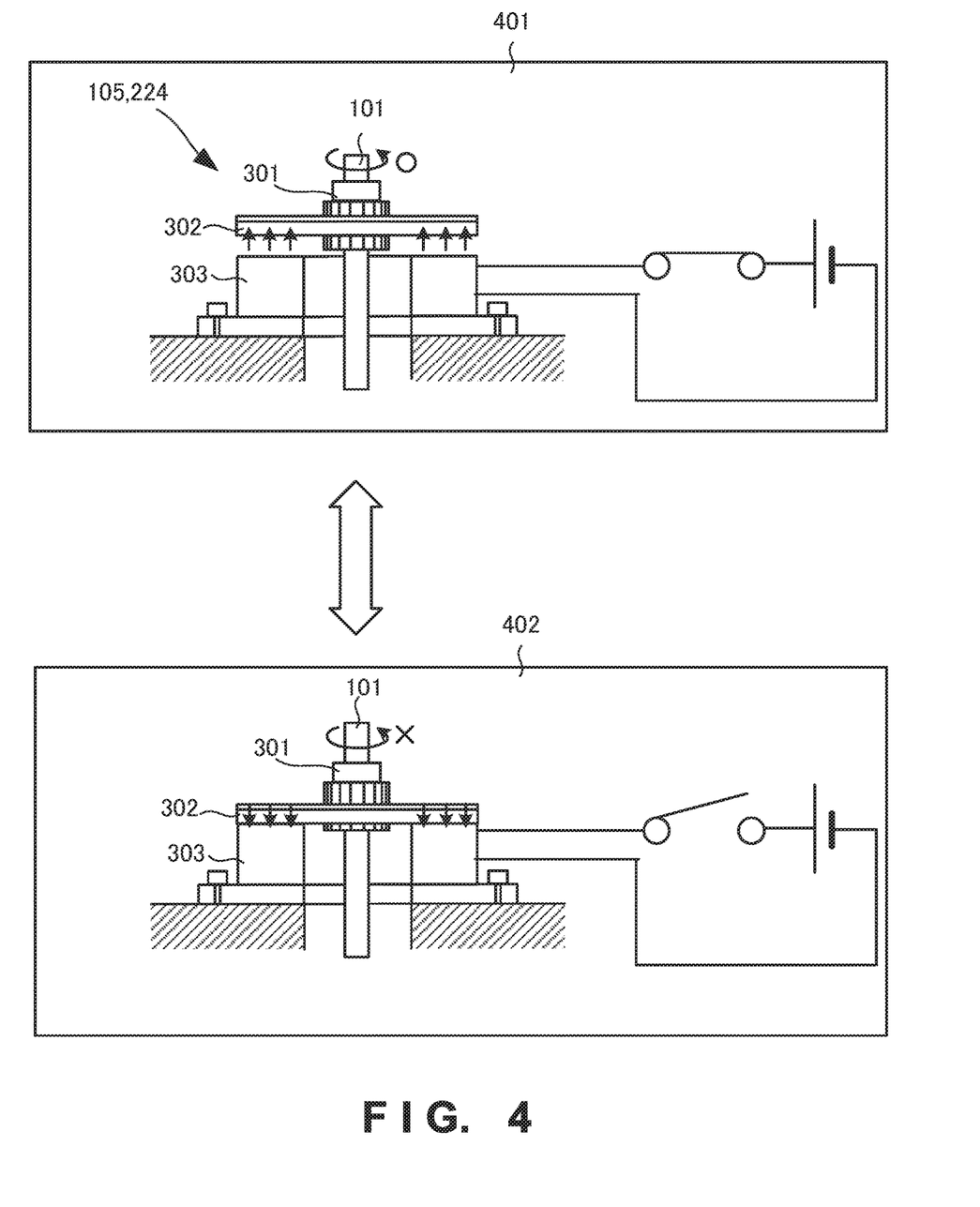
FIG. 4 is a partially cutaway perspective view of the electromagnetic brake according to the second embodiment of the present invention.

FIGS. 3 and 4 are views for explaining the arrangement of the electromagnetic brakes 105 and 224. FIG. 3 is an exploded view of the electromagnetic brake 105, and FIG. 4 is a function explaining view. The brake shown in FIGS. 3 and 4 is set in a fixed state or released state in accordance with whether (a magnet on) a rotating disk is attracted to or repelled from a coil.

As shown in FIG. 3, the distal end portion of the ball screw 101 is fixed to a gear 301. Also, the gear 301 meshes with a disk-like magnet 302. Therefore, the magnet 302 rotates together with the ball screw 101. A coil 303 is formed below the magnet 302 in FIG. 3. When electric power is supplied to the coil 303, the magnet 302 slightly separates from the coil 303, so the ball screw 101 becomes rotatable (an upper state 401 in FIG. 4).

On the other hand, when power supply to the coil 303 is stopped, the coil 303 and magnet 302 attract each other and come in tight contact with each other, and the rotation of the magnet 302 stops due to the friction between them. Consequently, the gear 301 fixed to the magnet 302 and the ball screw 101 fixed to the gear 301 also stop rotating. When power supply is stopped, therefore, the ball screw 101 is fixed and becomes unable to freely rotate (a lower state 402 in FIG. 4).

That is, when an electric current is supplied to the coil, the coil repels and releases the disk, so the ball screw rotates. When the power supply is OFF, the ball screw does not rotate.

Figure 5A:
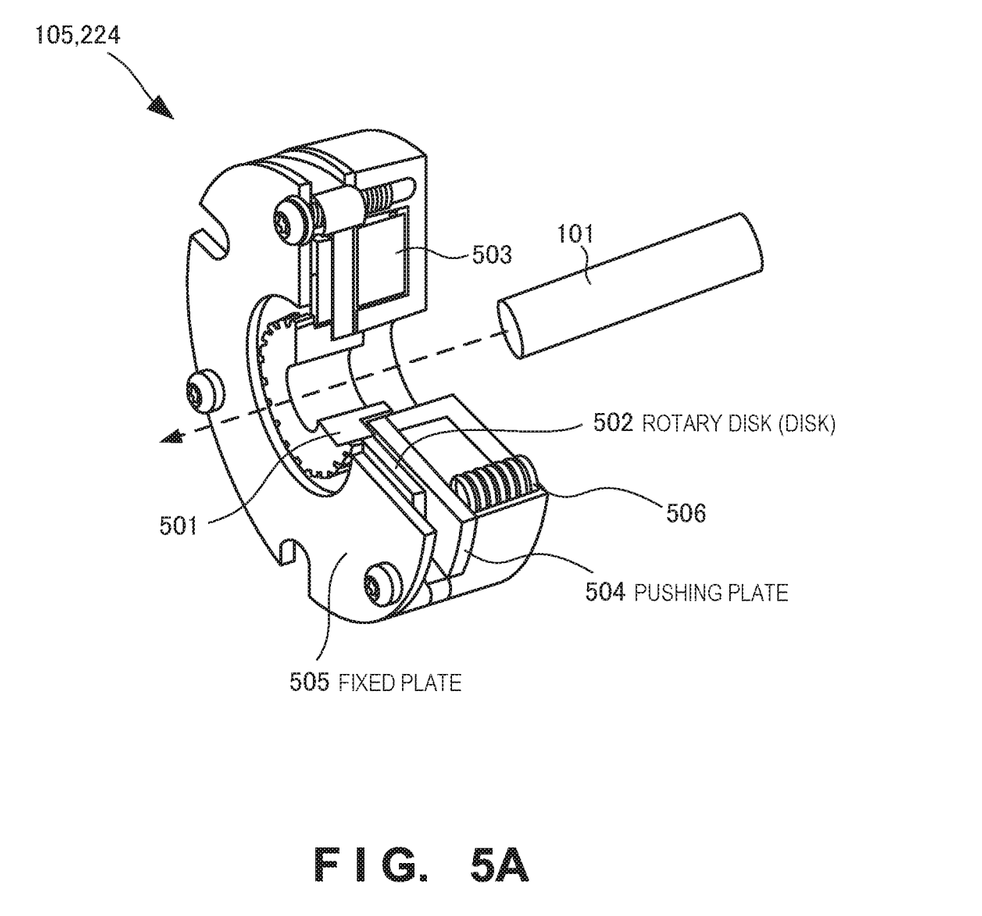
FIG. 5A is a view for explaining the operation of the electromagnetic brake according to the second embodiment of the present invention.
Figure 5B:
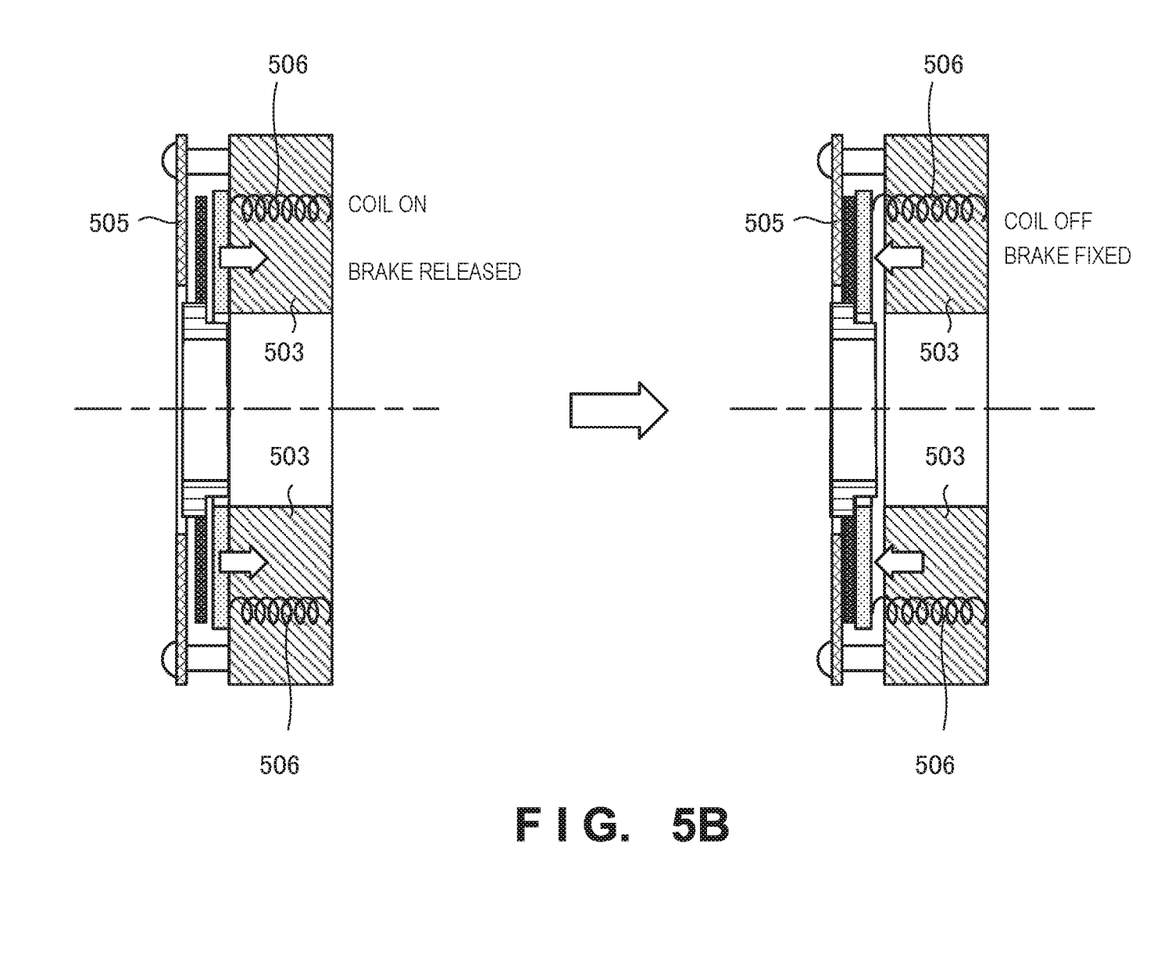
FIG. 5B is a sectional view showing the arrangement of the electromagnetic brake according to the second embodiment of the present invention.

FIGS. 5A and 5B show an example of an electromagnetic brake having another structure. The electromagnetic brake shown in FIG. 5A does not have a structure in which a rotating disk 502 itself is attracted to a coil 503. This electromagnetic brake operates in a state in which the rotating disk 502 is pushed by a pushing plate 504 against a fixed plate 505 fixed outside the rotating disk 502, or in a state in which the rotating disk 502 is not pushed but released. The pushing plate 504 is pushed by a spring and moves in the direction of the outside fixed plate 505. Since the disk 502 is sandwiched between the pushing plate 504 and the fixed plate 505, the rotating disk 502 is also sandwiched and fixed when the pushing plate 504 is pushed by the spring. On the other hand, when an electric current is supplied to the coil 503, the pushing plate 504 is attracted to the coil 503 against a spring 506, so the rotating disk 502 is released.

If the disk 502 is worn down by friction or misaligned, the electromagnetic brake does not function in some cases when the power supply is turned off. If this is the case, the movable part 203 moves down by gravity while rotating the ball screw 101, and this is very dangerous. Accordingly, a mechanism which gives redundancy by attaching a plurality of electromagnetic brakes has been adopted. However, redundancy like this makes it difficult to find a trouble occurring in an electromagnetic brake. While the braking ability is sufficient, therefore, the trouble detector 107 determines a fall of the movable part 203 based on a rotation amount detected by the encoder 225 attached to the driving motor 221, thereby detecting a trouble of the electromagnetic brake.

When powering off the driving mechanism unit 200 of the machine tool, the brake controller 106 stops power supply to the driving motor 221, and alternately releases at least one of the at least two electromagnetic brakes 105 and 224. That is, the brake controller 106 inspects the electromagnetic brakes 105 and 224 when powering off the driving mechanism unit 200 of the machine tool. In addition, when powering on the whole matching tool or the whole driving mechanism unit 200 of the machine tool, the trouble detector 107 compares the fall distance of the movable part 203 since power-OFF with a predetermined threshold. If the movable part 203 has fallen more than the predetermined threshold, the trouble detector 107 determines that an unreleased electromagnetic brake of the at least two electromagnetic brakes 105 and 224 has a trouble.

Note that the encoder 225 determines a fall of the movable part 203 in this embodiment, but the present invention is not limited to this. For example, it is also possible to detect the position of the movable part 203 by an optical scale or magnetic scale formed along the ball screw 101.

Note also that it is not always necessary to specify a electromagnetic brake with trouble in this embodiment. If it is found by the above-mentioned brake check that a given electromagnetic brake is broken, a special operator performs maintenance.

By causing the electromagnetic brakes 105 and 224 to alternately function when turning off the power supply, a difference between the position of the movable part 203 when the power supply is turned off and the position of the movable part 203 when the power supply is turned on can be determined when the power supply is turned on. That is, in this embodiment, it is possible to detect abnormality of a given electromagnetic brake of the driving mechanism unit 200 of the machine tool.

Third Embodiment

Figure 6:
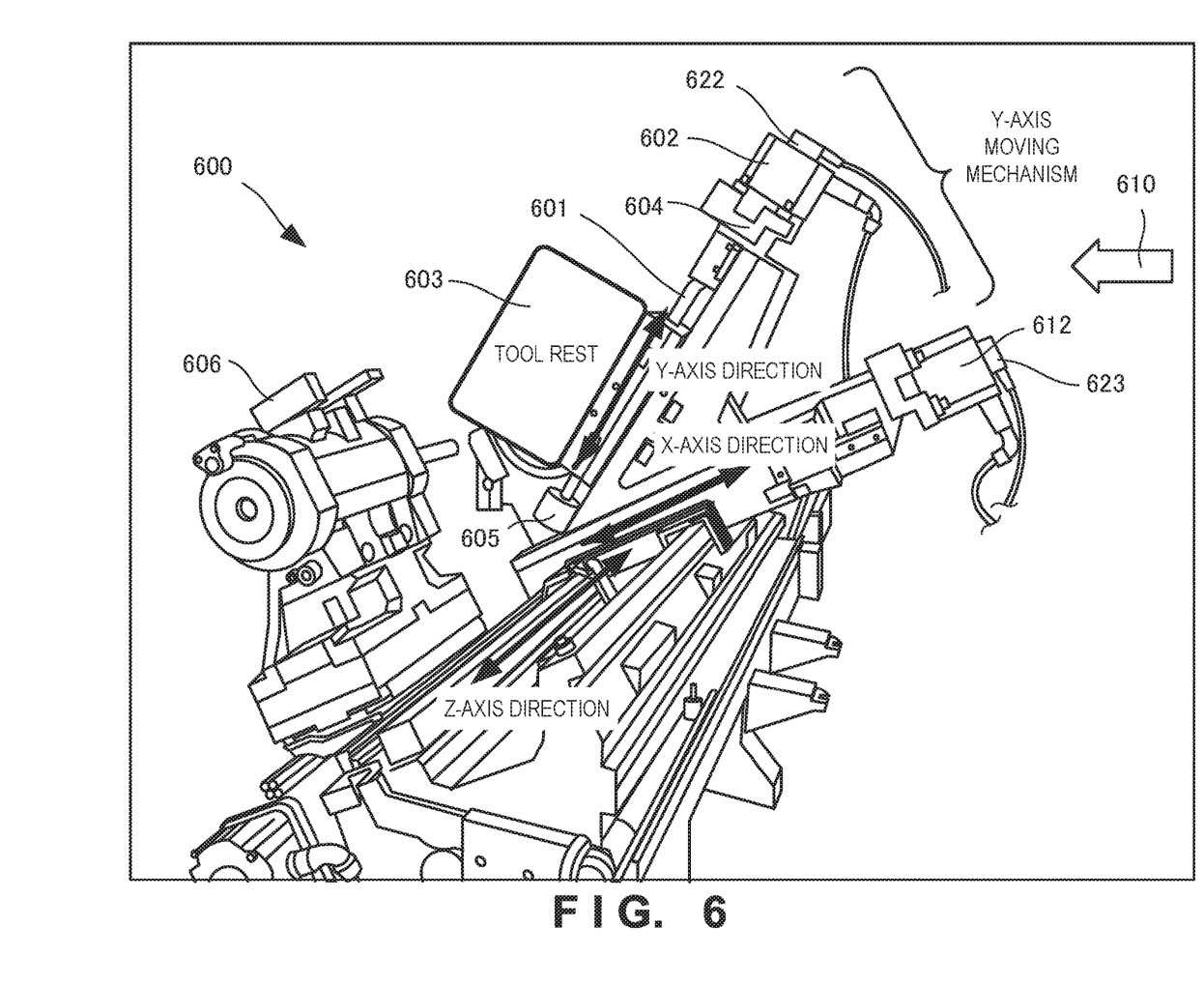
FIG. 6 is a perspective view showing the outer appearance of an NC lathe according to the third embodiment of the present invention.

A machine tool according to the third embodiment of the present invention will now be explained with reference to FIGS. 6 and 7. FIG. 6 is a view showing the outer appearance of an NC (Numerical Control) lathe 600 as a machine tool according to this embodiment. Differences from the above-mentioned second embodiment are that the NC lathe 600 has a ball screw 601 in the Y-axis direction, and a tool rest 603 moves along the ball screw 601. The rest of the arrangement and the operations are the same as those of the second embodiment, so the same reference numerals denote the same components and operations, and a detailed explanation thereof will be omitted.

A Y-axis servo motor 602 vertically moves the tool rest 603 as a movable part along the ball screw 601. On the other hand, an X-axis servo motor 612 moves a whole Y-axis moving mechanism in the X-axis direction. In a state in which the tool rest 603 has moved to a lower predetermined position, an object to be processed attached to a spindle head 606 is cut by a tool attached to the tool rest 603.

Also, an electromagnetic brake 604 is formed immediately below the servo motor 602 so that the tool rest 603 does not freely fall while power supply is stopped. In addition, a second electromagnetic brake 605 is formed in the downstream end of the ball screw 601. In this arrangement, the electromagnetic brakes 604 and 605 are alternately operated and alternately turned off, and whether the moving distance of the tool rest 603 is equal to or larger than a predetermined value is determined by using encoders 622 and 623. Troubles of the electromagnetic brakes 604 and 605 are detected in accordance with the determination result.

Figure 7:
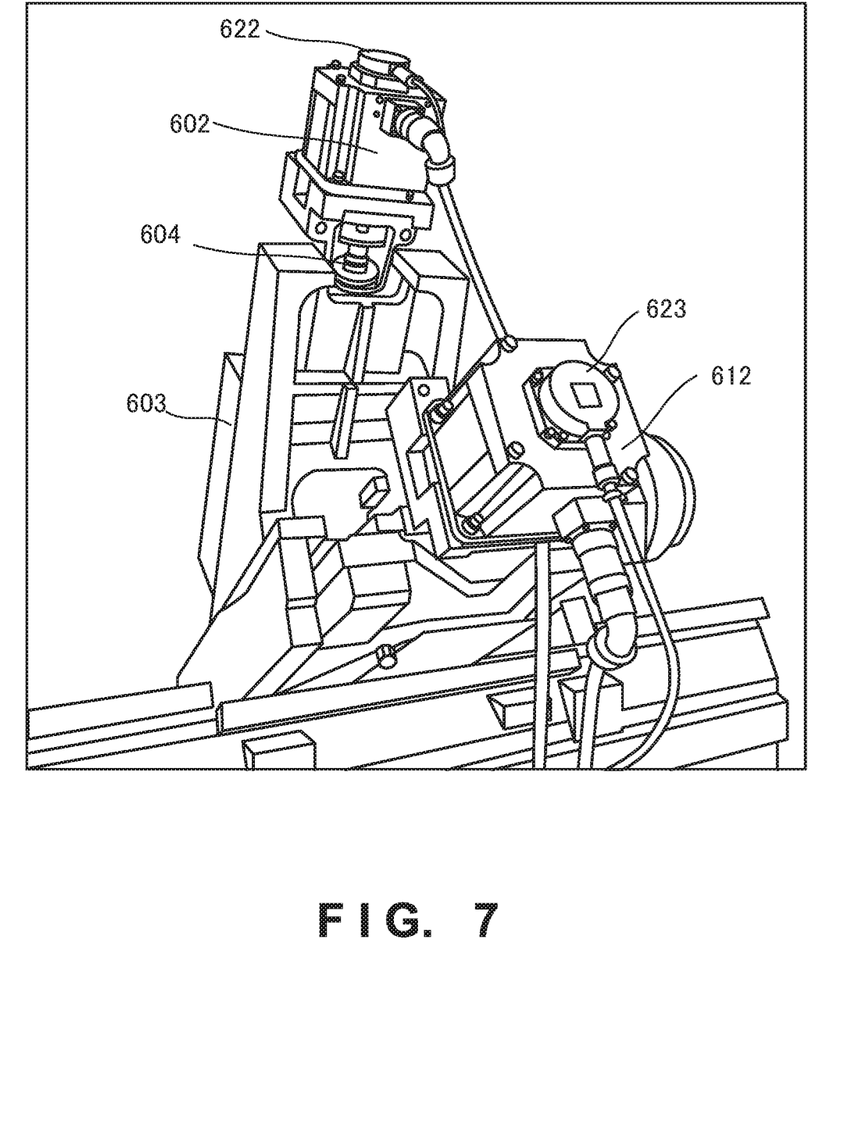
FIG. 7 is a perspective view showing the outer appearance of the NC lathe according to the third embodiment of the present invention.

FIG. 7 is a view showing the NC lathe 600 in the direction of an arrow 610 in FIG. 6. FIG. 7 shows that the electromagnetic brake 604 is formed on the downstream side of the Y-axis servo motor 602. At the same time power supply to the servo motor 602 stops, the electromagnetic brake 604 operates and stops the ball screw 601.

As explained above in this embodiment, the present invention is applicable to an NC lathe.

Fourth Embodiment

Figure 8:
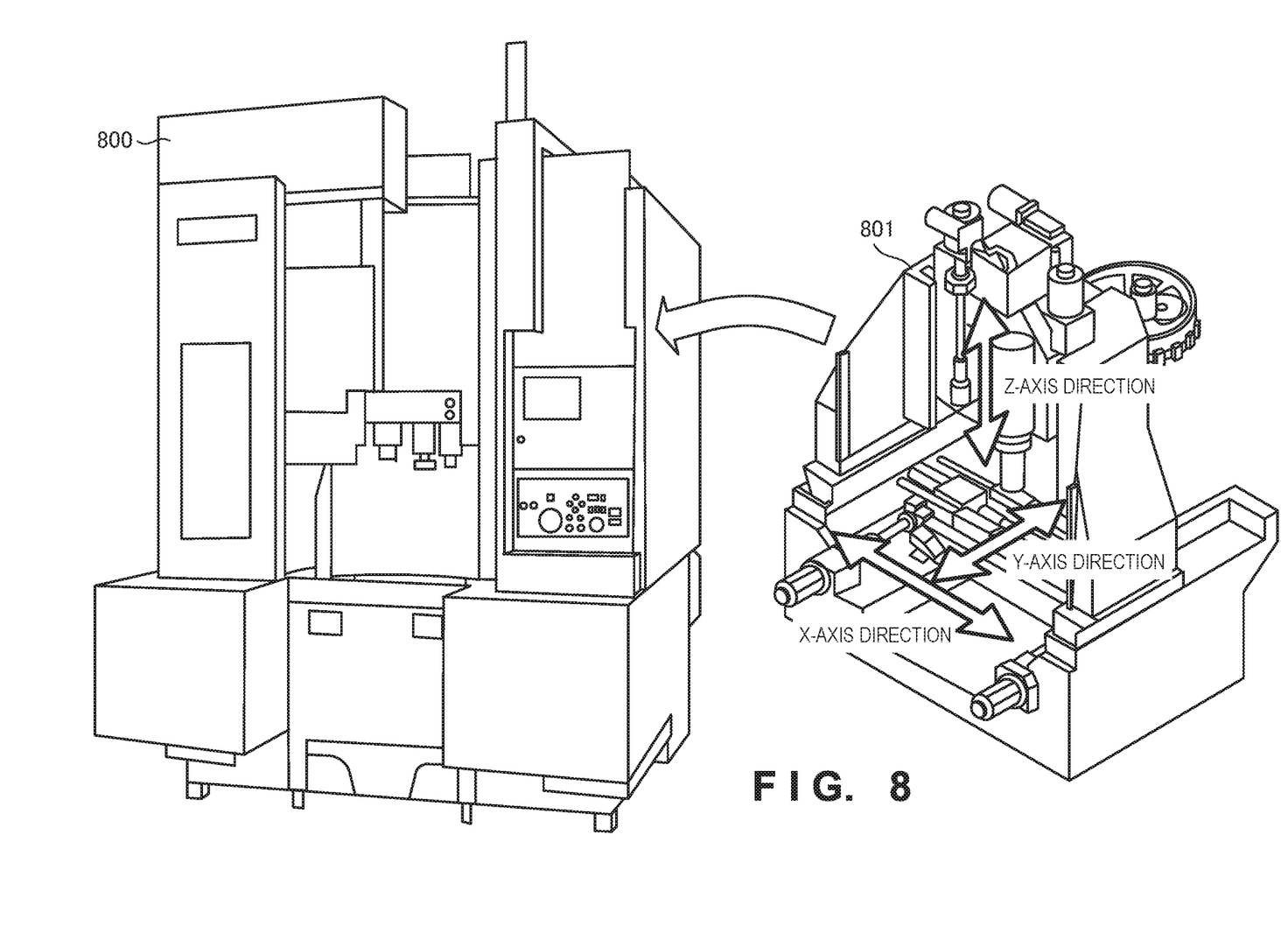
FIG. 8 is a perspective view showing the outer appearance of a vertical machining center according to the fourth embodiment of the present invention.
Figure 9:
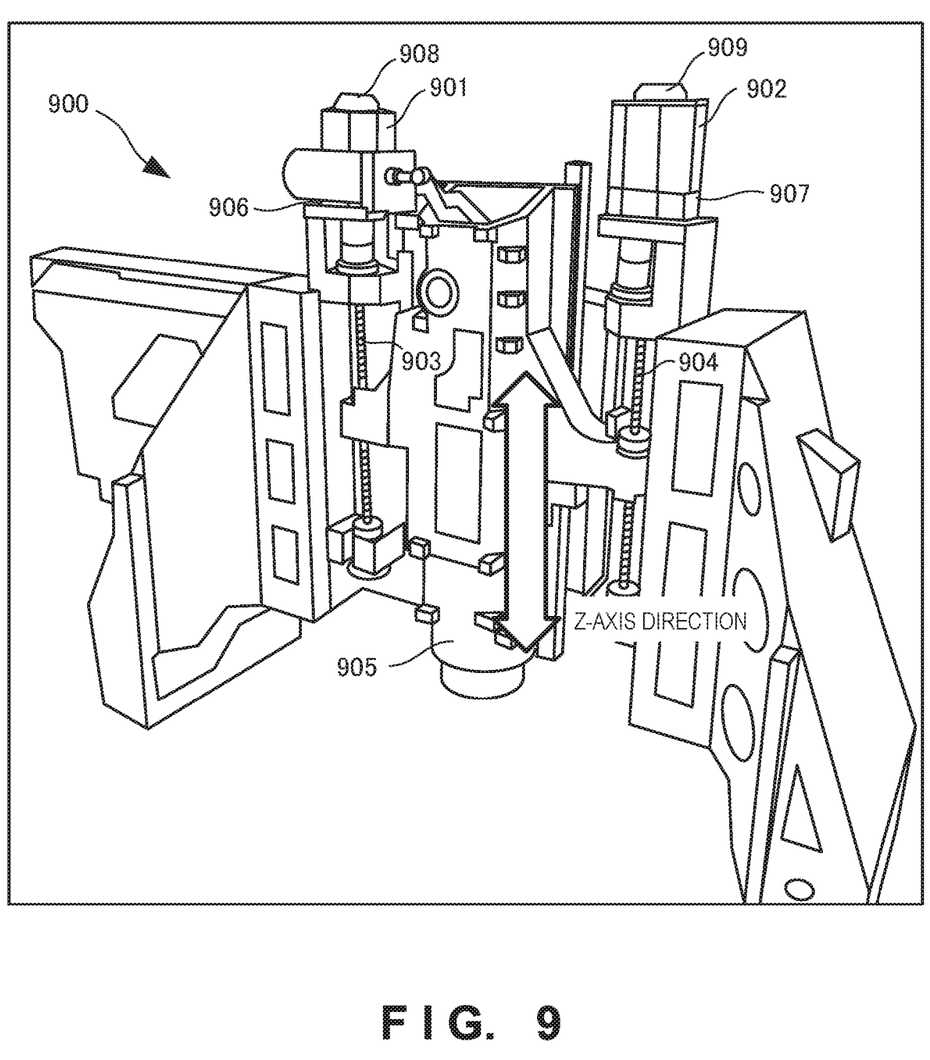
FIG. 9 is a perspective view of a moving mechanism unit of the vertical machining center according to the fourth embodiment of the present invention.

A machine tool according to the fourth embodiment of the present invention will be explained below with reference to FIGS. 8 and 9. FIG. 8 is a view showing the overall outer appearance of a vertical machining center 800. FIG. 9 is a view specifically showing a Z-axis-direction spindle moving mechanism incorporated into the vertical machining center 800.

In the vertical machining center 800, a moving mechanism 801 for relatively moving the tool spindle and an object to be processed in the X-axis direction, Y-axis direction, and Z-axis direction is formed. The moving mechanism 801 includes a Z-direction moving mechanism 900 shown in FIG. 9. The moving mechanism 900 includes two Z-axis servo motors 901 and 902, and ball screws 903 and 904 to be rotated by these servo motors. Also, a spindle head 905 as a movable part which vertically moves in the Z-axis direction as the ball screws 903 and 904 rotate is formed.

The servo motors 901 and 902 respectively include electromagnetic brakes 906 and 907, and hence are made redundant so as to reliably prevent the rotations of the two ball screws 903 and 904 even when power supply to the servo motors 901 and 902 stops.

The electromagnetic brakes 906 and 907 and encoders 908 and 909 are respectively attached to the servo motors 901 and 902. When no power is supplied to the servo motors 901 and 902, the electromagnetic brakes 906 and 907 grip the ball screws 903 and 904 so that they do not rotate. The encoders 908 and 909 detect the rotational angles of the rotating shafts of the servo motors connected to the ball screws, thereby detecting troubles of the electromagnetic brakes 906 and 907.

As explained above in this embodiment, the present invention is also applicable to a vertical machining center.

Other Embodiments

The present invention has been explained above with reference to the embodiments, but the present invention is not limited to the above-mentioned embodiments. Various changes understandable by those skilled in the art can be made for the arrangements and details of the present invention within the scope of the invention. Also, the scope of the invention includes a system or apparatus obtained by combining different features included in these embodiments.

The invention claimed is:

1. A machine tool comprising:
a ball screw extended in a vertical direction;
a driving motor that rotates said ball screw;
a movable part that vertically moves along said ball screw in accordance with the rotation of said ball screw driven by said driving motor;
at least two brakes that prevent a fall of said movable part while power supply to said driving motor is stopped;
a brake controller that performs an all brake activation by activating, one by one, each of said at least two brakes while releasing all of the at least two brakes except the activated brake, while power supply to said driving motor is stopped; and
a detector that detects presence or absence of a fall of said movable part or a fall distance of said movable part after the all brake activation, thereby detecting a trouble of at least one of said at least two brakes without identifying an individual brake with said trouble,
wherein when powering off the machine tool, said brake controller stops power supply to said driving motor and releases at least one of said at least two brakes,
wherein said detector determines whether or not at least one of said at least two brakes has a trouble based on the detected presence or absence of the fall of said movable part or the fall distance of said movable part resulting from the all brake activation.

2. The machine tool according to claim 1, wherein when powering off the machine tool, said brake controller stops power supply to said driving motor, and operates said at least two brakes one by one and releases the rest of said at least two brakes, and
wherein after causing the at least two brakes to function one by one, said detector detects the presence or absence of a fall of the movable part or the fall distance of the movable part, and troubles of the at least two brakes.

3. The machine tool according to claim 1, wherein said detector determines a fall of said movable part based on a rotation amount detected by a built-in encoder of said driving motor.

4. The machine tool according to claim 1 wherein when powering on the whole machine tool, said detector determines the fall distance of said movable part since power-OFF, thereby detecting troubles of said at least two brakes.

5. The machine tool according to claim 2, wherein said detector determines a fall of said movable part based on a rotation amount detected by a built-in encoder of said driving motor.

6. The machine tool according to claim 5, wherein when powering on the whole machine tool, said detector determines the fall distance of said movable part since power-OFF, thereby detecting troubles of said at least two brakes.

7. The machine tool according to claim 2, wherein when powering on the whole machine tool, said detector determines the fall distance of said movable part since power-OFF, thereby detecting troubles of said at least two brakes.

8. The machine tool according to claim 3, wherein when powering on the whole machine tool, said detector determines the fall distance of said movable part since power-OFF, thereby detecting troubles of said at least two brakes.

9. A brake checking method for a machine tool including:
a ball screw extended in a vertical direction;
a driving motor that rotates the ball screw;
a movable part that vertically moves along the ball screw in accordance with the rotation of the ball screw driven by the driving motor; and
at least two brakes that prevent a fall of the movable part while power supply to the driving motor is stopped,
the method comprising:
performing an all brake activation by activating, one by one, each of the at least two brakes while releasing all of the at least two brakes except the activated brake, while power supply to the driving motor is stopped; and
detecting a fall of the movable part or a fall distance of the movable part after the all brake activation, thereby detecting a trouble of at least one of the at least two brakes without identifying an individual brake with said trouble,
wherein when powering off the machine tool, power supply to the driving motor is stopped and at least one of the at least two brakes is released, wherein a trouble of at least one of the at least two brakes is detected by detecting presence or absence of the fall of the movable part or the fall distance of the movable part resulting from the all brake activation.

\* \* \* \* \*